(12) United States Patent
Medellin (10) Patent No.: US 12,549,389 B2
(45) Date of Patent: Feb. 10, 2026

(54) DEVICE FOR IMPLEMENTING GATED ARRAY BLOCKCHAIN PROTECTION CODES FOR IOT DEVICES

(71) Applicant: Medellin Applied Research Concepts, LLC, Highland Village, TX (US)

(72) Inventor: John M. Medellin, Highland Village, TX (US)

(73) Assignee: Medellin Applied Research Concepts, LLC, Highland Village, TX (US)

( * ) Notice: Subject to any disclaimer, the term of this patent is extended or adjusted under 35 U.S.C. 154(b) by 343 days.

(21) Appl. No.: 17/850,852

(22) Filed: Jun. 27, 2022

(65) Prior Publication Data
US 2022/0417045 A1  Dec. 29, 2022

Related U.S. Application Data

(60) Provisional application No. 63/215,726, filed on Jun. 28, 2021.

(51) Int. Cl.
*H04L 9/00* (2022.01)
*H04L 9/06* (2006.01)
*H04L 9/32* (2006.01)

(52) U.S. Cl.
CPC ............... *H04L 9/50* (2022.05); *H04L 9/00* (2013.01); *H04L 9/0643* (2013.01); *H04L 9/3236* (2013.01)

(58) Field of Classification Search
CPC . H04L 9/00; H04L 9/50; H04L 9/0643; H04L 9/3236; G09C 1/00
See application file for complete search history.

(56) References Cited

U.S. PATENT DOCUMENTS

| | | | | |
|---|---|---|---|---|
| 10,657,293 | B1* | 5/2020 | Wei | H04L 9/0866 |
| 11,490,299 | B2* | 11/2022 | Crawford | H04L 69/40 |
| 2020/0167779 | A1* | 5/2020 | Carver | G06Q 20/3829 |
| 2020/0366495 | A1* | 11/2020 | Mahoney | G06Q 20/3674 |
| 2021/0152471 | A1* | 5/2021 | Lee | H04L 43/0811 |

OTHER PUBLICATIONS

"Performance Characteristics of Two Blockchain Consensus Algorithms in a VMware Hypervisor"—Medellin et al., Lyle School of Engineering, SMU, May 4, 2018 https://s2.smu.edu/~mitch/ftp_dir/pubs/gcc18 (Year: 2018).*
"Blockchain Consensus Algorithm Design Based on Consistent Hash Algorithm"—Yang et al., 2019 20th International Conference on PDCAT, Dec. 7, 2019 https://ieeexplore.ieee.org/document/9029081 (Year: 2019).*
Diffie et al., "Multiuser cryptographic techniques", IEEE Transactions on Information Theory, Nov. 1976, pp. 109-112.
Anonymous, "Project F: Fpga Dev", URL: https://projectf.io/posts/division-in-verilog/, accessed Feb. 17, 2021, 13 total pages.
Ferguson et al., "Cryptography Engineering, Design Principles and Practical Applications", Wiley Publishing, Inc., Indianapolis, Indiana, 2010, 385 total pages.

(Continued)

*Primary Examiner* — Randy A Scott
(74) *Attorney, Agent, or Firm* — Crowell & Moring LLP (57) ABSTRACT

A device that includes a plurality of field programmable gated arrays (FPGAs), collectively configured to generate blocks of data, based on gated operations that have derived, communicated, previously generated or random inputs.

20 Claims, 5 Drawing Sheets

(56) References Cited

OTHER PUBLICATIONS

P. Chu, "FPGA Prototyping by VHDL Examples", Wiley Publishing, Inc., Hoboken, New Jersey, 2008, 471 total pages.
S. Nakamoto, "Bitcoin: A Peer-to-Peer Electronic Cash System", www.bitcoin.org, last accessed Mar. 19, 2019, pp. 1-9.
Medellin et al., "Performance Characteristics of Two Blockchain Consensus Algorithms in a VMWare Hypervisor", 2018 International Conference on Grid & Cloud Computing and Applications, 6 total pages.
Medellin et al., "Simulating Resource Consumption in Three Blockchain Consensus Algorithms", 2017 International Conference on Modeling, Simulation & Visualization Methods, 5 total pages.
C. Kozierok, "The TCP/IP Guide, a Comprehensive, Illustrated Internet Protocols Reference", No Starch Press, Inc., San Francisco, CA, 2017, 1671 total pages.

\* cited by examiner

| Scenario | Inputs | | Logic Gate Outputs (Z) | | | | | |
|---|---|---|---|---|---|---|---|---|
| | X | Y | OR | NOR | AND | NAND | XOR | XNOR |
| 1 | 1 | 1 | 1 | 0 | 1 | 0 | 0 | 1 |
| 2 | 1 | 0 | 1 | 0 | 0 | 1 | 1 | 0 |
| 3 | 0 | 1 | 1 | 0 | 0 | 1 | 1 | 0 |
| 4 | 0 | 0 | 0 | 1 | 0 | 1 | 0 | 1 |

```
         Participant A                    Participant B (1) Consult Blockchain
Op: get current hash
Op: encrypt original epoch and secret
 key with current hash and epoch hash
Send message #1 to B------->(2) Rec: original epoch hash / epoch and secret
                                      key encrypted with hash
                            Op: consult B/C for hash
                            Op: decrypt message with hash & get prior epoch
                            Op: get prior hash of epoch, decrypt secret key
                            Op: verify blockchain: no deprecation
                            Op: If ok, encrypt B's epoch of admit + that secret
                                      key with epoch and hash
  (3)<-------------------------Send message #2
Rec: B's admit epoch & secret key
Op: XOR decrypt B's with hash & epoch
Op: Compute implied B's secret key for encryption
Op: XOR B's implied secret key with gate sequence
Send message #3----------->(4) Rec message #3
                            Op: XOR decrypt B's w gate sequence & verifies
                                 computation
  <----------------------------Send: ACK (message #4)
```

DEVICE FOR IMPLEMENTING GATED ARRAY BLOCKCHAIN PROTECTION CODES FOR IOT DEVICES

This application claims the benefit of U.S. Provisional Application No. 63/215,726, filed Jun. 28, 2021, the entire disclosure of which is expressly incorporated by reference herein.

FIELD OF THE INVENTION

The invention is directed to a device (physical or virtual) that generates, transmits and/or stores codes by using logic gates in a blockchain pattern that lowers the computation requirements with respect to traditional key exchange methods. The invention is applicable to such technologies as the Internet of Things (IoT) or Cloud Computing.

BACKGROUND

Symmetric key cryptography is a well-known cryptographic method that uses a shared secret key to encrypt and decrypt data, e.g., electronic messages, as well as for entity verification purposes. According to such methods, entities Alice and Bob can use the shared secret key to decrypt data encrypted using the shared secret key.

Asymmetrical key cryptography is a well-known cryptographic method that uses pairs of cryptographic keys, i.e., public keys and private keys, to encrypt and decrypt data, e.g., electronic messages, as well as for entity verification purposes. According to such methods, entities Alice and Bob can use respective private keys to decrypt data encrypted using a shared public key.

Key sequences are used in order to enforce secrecy of messages and the ability to know that an entity is who they say they are. Traditional key exchanges imply the answer to a mutually-shared equation that has only one answer.

Figure 1:
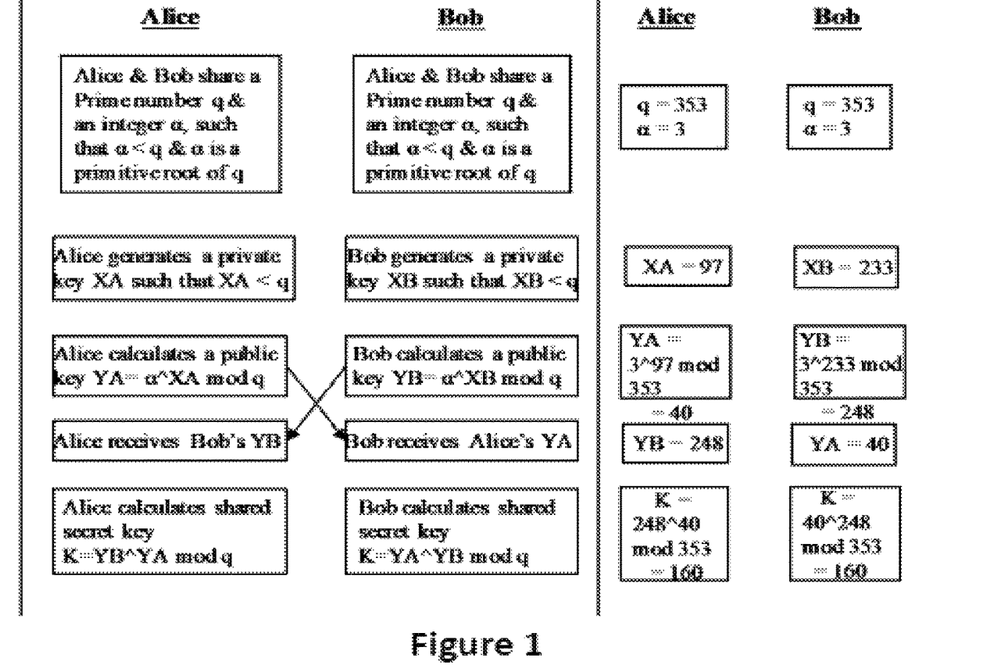
FIG. 1 schematically illustrates principles of a Diffie-Hellman key exchange for generating a secret key.

Asymmetrical key cryptography is often used to generate shared secret keys for subsequent use in symmetric cryptography, via a key exchange algorithm. FIG. 1 illustrates the principles of a Diffie-Hellman key exchange for generating a secret key [1]. It will be understood that, while the example shows a small number of digits, more digits are more often used, up to 512 or more [2], [3].

The left hand side of FIG. 1 shows the rules of operation for an exemplary Diffie-Hellman key exchange. The right hand side of FIG. 1 shows example values to illustrate those rules.

According to the Diffie-Hellman algorithm, the two entities, Alice and Bob, exchange a prime number q that is related by a unique number a. Each of Alice and Bob generate respective private keys based on the prime number, and then generate respective public keys based on their respective private keys, the prime number q and the unique number a (e.g., using modular arithmetic). Alice and Bob exchange their respective public keys. Alice uses Bob's public key to calculate the shared secret key, and vice versa, which secret key can then be used by both entities for encrypting, decrypting and/or authentication.

This key-exchange process, however, is computationally intense on smaller processors (i.e., CPU's), because the computational requirements increase with the number of digits used and, in some cases, whether the secret key is required to be a prime number. For example, even where the process is limited to a plain division using standard decimal notation, the number of CPU cycles required is one per digit. This means that, in a very simple 512 decimal-numeric key, a minimum of 512 cycles is required. Due to these processing requirements, very small processors are often themselves left unprotected, and are instead attached to another, larger device that can carry out the key exchange.

These smaller processors may alternatively use a gated array approach to carry out the cryptographic calculations, instead of the traditional and more computationally intensive digital schemes that require compilation and/or special instruction sets [4]. A gated array is a set of logic gates arranged in a particular sequential pattern to yield a given result depending on the positive or negative inputs received in their starting state. The implementation in many devices requires the sequencing of gated operations in a particular way in order to drive a necessary output that could change the operation of some physical device.

Figure 2:
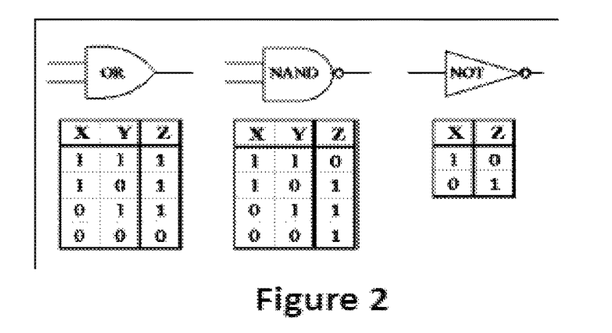
FIG. 2 schematically illustrates three typical logic gates as their engineering symbols, along with their outcomes (i.e., truth tables)
Figure 3:
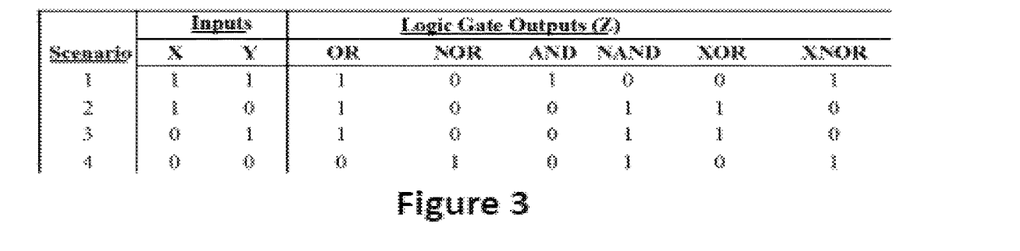
FIG. 3 schematically illustrates exemplary logic gate outcomes for a 2-input vector.

FIG. 2 shows three typical logic gates as their engineering symbols, with their outcomes (i.e., truth tables). FIG. 3 shows exemplary logic gate outcomes for a 2-input vector.

Figure 6:
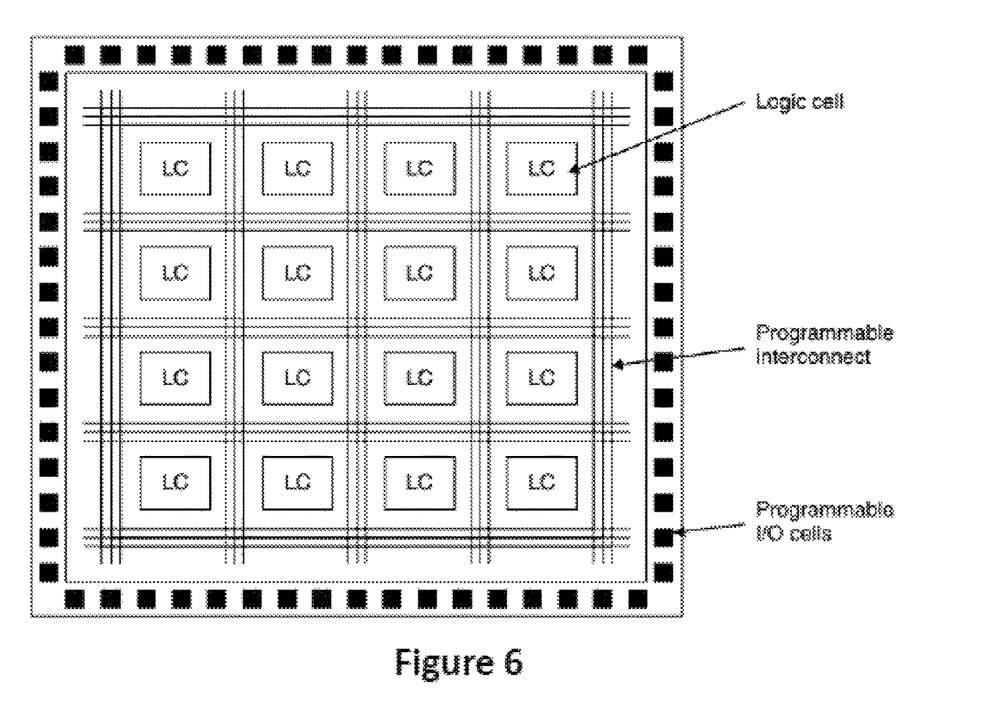
FIG. 6 schematically illustrates a block diagram of a typical Field Programmable Gated Array (FPGA)

FIG. 6 illustrates a block diagram of a typical Field Programmable Gated Array (FPGA). FPGA's are available in various different capacities of logic cells, programmable interconnects and programmable I/O cells. The logic cells can be configured to provide different gate functionality (for example "AND" or "XOR") via programming of different logic cell sequences. According to such sequences, the FPGA can receive inputs (1's and 0's) into the cells (e.g., using at least one two-way programmable interconnect), so as to generate a set of outputs (1's and 0's).

The gated array approach provides advantages in efficiencies, because the computation involves shifting bits based on the operation being executed, rather than an iterative approach, to derive an output. For example, a 32-bit processor can process up to 32 gate operations (i.e., one for every bit) instead of using an entire processing cycle (i.e., all 32 bits) in the computation of an arithmetic digit.

Figure 8:
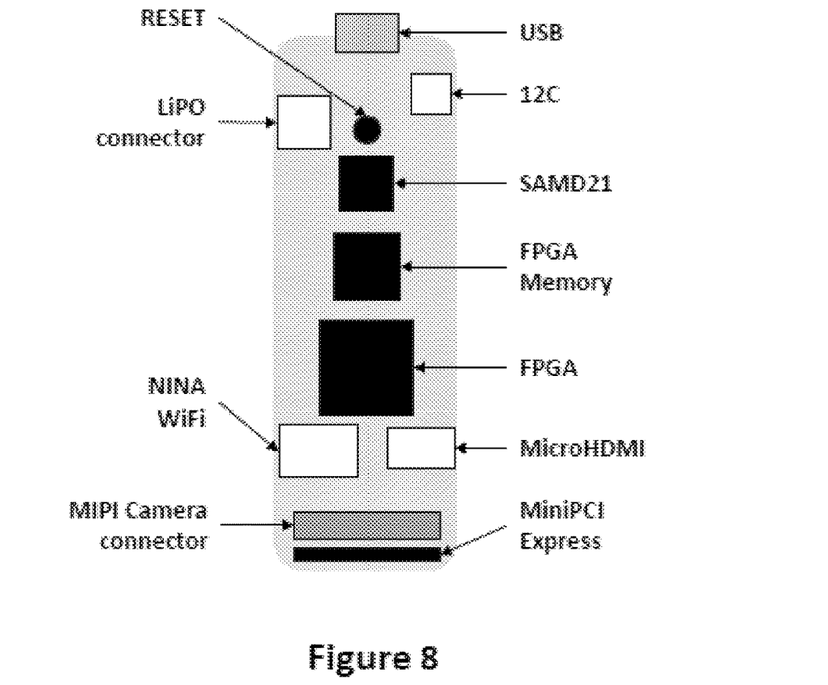
FIG. 8 schematically illustrates a known Arduino control unit with an embedded FPGA, FPGA memory, and ARM CORTEX (SAMD21) processor.

Computing devices are also known to include embedded FPGA's. For example, FIG. 8 illustrates a known Arduino control unit with an embedded FPGA, FPGA memory, and ARM CORTEX (SAMD21) processor.

Figure 4:
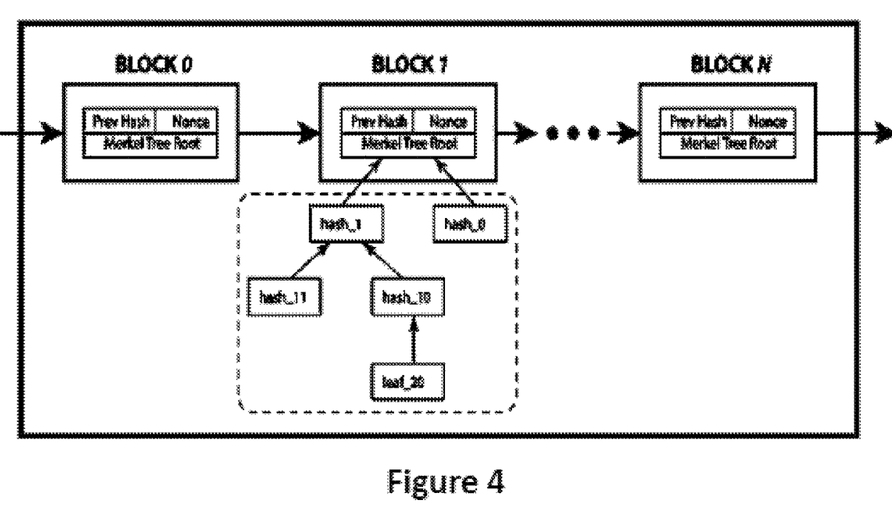
FIG. 4 schematically illustrates an exemplary merkel tree root comprising the prior blocks' hash values plus the new block's hash value.

A blockchain methodology is also known, which is based on shared data between parties and addition to those data blocks by special operations [5]. FIG. 4 illustrates exemplary principles of the blockchain methodology.

The blockchain is a set of blocks and has sequence data. Each block is attached to a prior block, with the hash value being carried from the previous block to the new block using merkel tree roots. FIG. 4 shows the merkel tree root comprising the prior blocks' hash values (previously computed), plus the new block's hash value (computed at block 1). The merkel tree root is therefore unique, with the assumption that the nonce value is unique to the entire blockchain.

There are many possibilities for generating and arranging blocks in the blockchain as well as admitting/deprecating members. These operations are executed by elected managers in a network of blockchain participants. However, the computational requirements of traditional blockchain networks are high.

Figure 5:
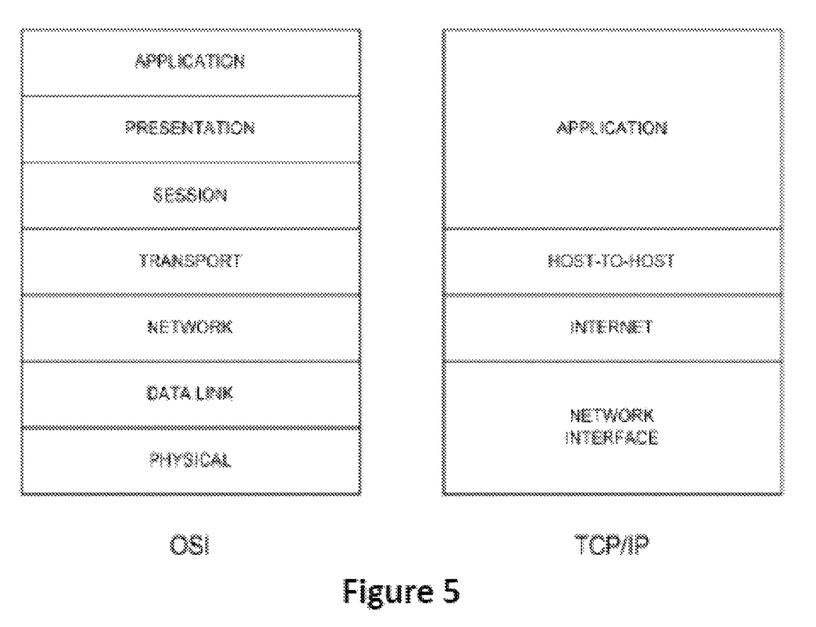
FIG. 5 schematically illustrates an Open Systems Interconnection model ("OSI model") and corresponding layers of the TCP/IP protocol.

Blockchain communication protocols are also generally known, via which devices within a blockchain system may communicate. Such communication protocols may include, for example, Transmission Control Protocol/Internet Protocol ("TCP/IP") [8]. FIG. 5 illustrates the Open Systems Interconnection model ("OSI model") and corresponding layers of the TCP/IP protocol.

FIG. 5 depicts the ISO-OSI model on the left, and to the right are the corresponding layers of the Transmission Control Protocol/Internet Protocol. The network interface in TCP/IP corresponds to the first two layers of ISO-OSI.

According to the TCP/IP protocols, a receiving device that receives a request to communicate from a requesting device will (1) transmit a message containing a challenge stream of bits to the requesting device, and (2) provide an answer to the challenge stream of bits in another message. If the challenge is answered correctly, the communication proceeds.

SUMMARY OF THE INVENTION

In at least some embodiments, the invention is directed to a physical and/or virtual machine (collectively and individually, "the machine") that includes a plurality of logic gates, via which the machine is configured to generate special purpose bit arrays as bocks for transmitting objects via blockchains. The machine may be configured to generate new sets of blocks, and to append the new sets of blocks to an existing blockchain, in the course of an epoch (i.e., a time-dimensioned process according to which new blocks are generated and appended to the blockchain). Each of the generated blocks may comprise the special purpose bit arrays, which may be generated by combining different sequences of the logic gates using inputs, e.g., from random number generation, other bit arrays in prior epochs.

The use of the gated arrays allows for locating the pattern in the small non-volatile storage. Moreover, because computing devices are often manufactured with more logic gates than are necessary to accomplish the controllers' primary function, there are often unused logic gates, which can be used to embody the machine, further promoting efficiency. Thus, the smaller computing devices can accomplish cryptographic functions more efficiently and effectively than the prior art approaches.

In at least some embodiments, the machine is configured to receive and store new blocks in a non-volatile storage. Accordingly, the machine may communicate with other machines using the same blockchain functionality by traversing the blocks and finding combinations that give certainty of identity. In some embodiments, the machine may receive streamed input into its buffer and writes it to non-volatile storage. Sections in the non-volatile storage may also house the configuration of the blocks themselves and is used in describing the structure of the message (sent and received).

In at least some embodiments, the machine is configured to communicate with other machines using a blockchain communication protocol. The machines may, for example, communicate in accordance with known TCP/IP stack principles and/or protocols [8]. The machine may also be configured to update blocks that may not have been updated through adjacency via the TCP/IP stack principles/protocols. By using the gates available to compute and the history stored to validate, the machine will establish a session within TCP/IP for the proper key exchange with another willing participant.

The present invention enables cryptographic communication between machines, such that both parties have access to specific bits and sequences of gates stored in the blockchain that together with their private keys and public keys published will allow for validation of each other's identity and computation of each other's secret keys. In particular, the machines utilize a blockchain to store the secrets and the operationalization of input through logic gates rather than other mathematical techniques and operations.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated.

Further in accordance with the practices of persons skilled in the art, aspects of one or more embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, code segments perform certain tasks described herein. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, well-known methods, procedures, components, and circuits have not been described in detail.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like.

In addition, and further in accordance with the descriptions herein, the term "logic," as used herein, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

Figure 11:
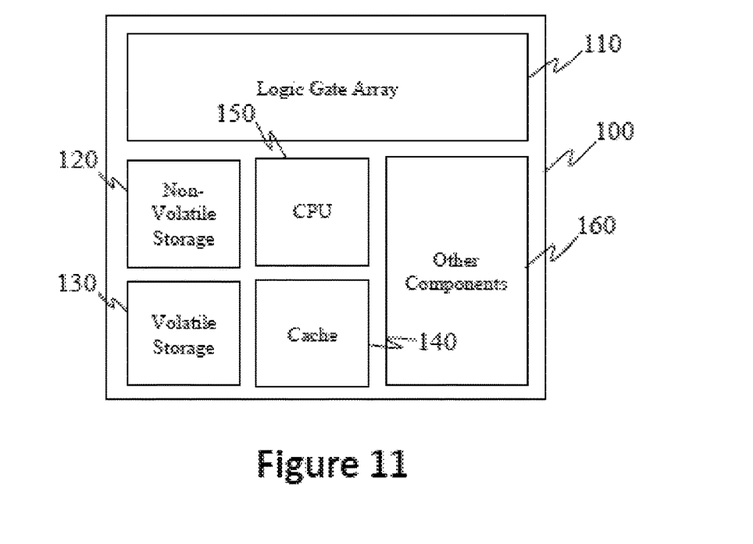
FIG. 11 is a schematic diagram of an exemplary physical or virtual machine in accordance with at least one embodiment.

FIG. 11 is a schematic diagram of an exemplary physical or virtual machine 100 that uses a plurality of logic gates to generate special purpose bit arrays as bocks for transmitting objects via blockchains, in accordance with at least one embodiment. Exemplary systems in accordance with at least one embodiment may include a plurality of such machines interacting in accordance with the principles described herein.

Each machine includes a logic gate array 110 (i.e., FPGA), a non-volatile storage 120, a volatile storage 130, a cache 140, and a processor 150 (i.e., CPU).

The logic gate array includes a plurality of logic gates, which may include a set of logic gates arranged in a sequential pattern. The sequential pattern may be such that the logic gate generates a sequence of binary digits (i.e., a digit sequence), whose values depend on the positive or negative inputs received by the logic gates. The sending of the inputs through the sequence of gates may produce the digit sequence. The digit sequence may be useable, via the principles discussed herein, to approach another machine, calculate a challenge, respond to a challenge, and/or derive the shared bit stream key. The logic gate array may be an FPGA, or portion thereof.

The plurality of logic gates may be any number of logic gates, but is preferably 5,000 to 60,000 logic gates. The plurality of logic gates, or one or more subset thereof, may be AND, OR, XOR, NAND, NOR and XNOR logic gates.

The non-volatile storage may be one or more physical memories (e.g., ROM, MOS memory, etc.) configured as long-term persistent storage to store data therein. The non-volatile storage may be of any size, but is preferably at least 2 MB.

The volatile storage may be one or more physical memories (e.g., DRAM, SRAM, etc.) configured as short-term volatile storage to store data therein. The volatile storage may be of any size, but is preferably at least 64 KB.

The cache may be may be one or more physical memories configured as a cache memory to speed up one or more of the processes described herein. The cache may be of any size, but is preferably 2 KB. In some embodiments, the machine (or one or more machines of the system) may not include the cache.

The CPU may be any processor, dedicated or shared with the computing device. The CPU be an 8-bit processor, or can be of any commercially available size. The CPU may be wholly included in the virtual machine or may be shared with a host machine.

Other components 160 of the machine architecture, e.g., instruction buffer, etc., may follow the ARM Cortex configuration.

In some embodiments, the machine may be embodied within a computing device that includes an FPGA unit, an FPGA memory unit, and a processor unit. The logic gate array may be embodied in the FPGA unit. The volatile and/or non-volatile storages may be embodied in the FPGA memory unit. The processor may be embodied in the processor unit.

In at least some embodiments, the machine is configured to communicate with other machines using a blockchain communication protocol. The machines may, for example, communicate in accordance with known TCP/IP stack principles and/or protocols.

The machine may be configured to update blocks that may not have been updated through adjacency via the TCP/IP stack principles/protocols.

The machine may be configured to establish a session within the communication protocol (e.g., TCP/IP) for a key exchange with another machine, based on the machine's use of the logic gates to compute the digital sequence and the blockchain to validate a stored history. In a typical exchange of this nature using sub-protocol PPP of TCP/IP suite of protocols, once a machine receives an intent to communicate from another machine, it will send back a challenge stream of bits to be received by the initiator and provide an answer to that stream of bits in another message. If the challenge is answered correctly, the communication may proceed.

Operation of Epochs:

In operation, the virtual machine may generate new sets of blocks, and append them to an existing set (i.e., an existing blockchain). This time-dimensioned process is known as an "epoch" [6, 7]. The D-RAFT algorithm provides for random generation of epochs and election of managers between peers.

Once designated to do so, the machine will generate digit sequences for transmission to other machines in a communication network. The lengths of the digit sequences can be any length, but are preferably up to 5,000 per component. The digital sequences can further be managed via configuring the number of logic gates available and designated for this purpose in the machine (i.e., the physical, shared physical, virtual or shared virtual machine).

The generated blocks are binary digit sequences, and may include the following types of blocks:

Epoch ID
Manager Key and Epoch
Public Key
Gate Sequence
Admitted Key(s)
Deprecated Key(s) and Epoch(s)
Epoch Instruction
Epoch Rule
Epoch hash Each of the generated block types are bit data streams generated by combining different sequences of the available gates using inputs from either random number generation or from other bit sequences in prior epochs. This operation of the machine works in accordance with the D-RAFT algorithm, in which time-slices are called "epochs" and are administered by one peer machine.

In an initializing epoch (i.e., epoch 0), an initial machine may be admitted by a human administrator.

The initial machine further admits a given number (for example 100) per epoch by generating random either 1 or 0s for the admitted machine's private key for 4,000 bits (this assumes a 4,000 bit key is used, this can be varied as explained above).

The machine also generates one public key and one set of gate sequences at random. The generated keys are all preferably 4,000 bits.

The admitted machines are all uniquely admitted to epoch 0 (4,000 bits set to 0 in the epoch) by taking their private key, public key and interacting them as inputs into the gate sequence to produce their secret key.

Only the secret key is published in the blockchain, the private key is stored in nonvolatile storage for the machine and also stored into a special ledger component of the blockchain this item is a reserved space in the memory of each machine that is indexed by block ID.

The query of the private key ledger will require knowledge of the complete blockchain, the manager secret key and the presence of the machine with the private key being queried through a message to connect to a target peer machine.

This navigation will be done by traversing the blockchain and using the comparator to derive equivalence of the epoch being sought.

This traversal will be done by decrementing each epoch retrieved from memory (with the Epoch ID as key) and comparing using the AND gate (again, when all yield a 0 in comparison then the process will stop and the epoch will be present with all the blocks that were issued in that time slice).

Once the machines are admitted (they have a private key and an announced secret key in the blockchain), they can begin to communicate. The communication protocol is shown via exemplary dialog in FIG. 7.

When an epoch begins, a future "manager" machine is elected by generation and exchange of random numbers between the machines. These are compared to the current hash and a difference is obtained through the comparator gates. The differences are announced and the machine which generated the smallest number difference to the current hash is declared the new "manager".

Once the new epoch event bit is turned on by the timed event through an AND operation in the comparator, a new manager will begin a new epoch. This new "manager" will proceed with generation of new blocks on to the blockchain, as described herein, and communicate those data blocks to the other networked machines for them to store in their non-volatile storage.

Once those items are concluded, the "manager" again will call for an election and the same difference comparator algorithm will be used to designate the new "manager".

The epoch duration will be random-computed (meaning a set of bits generated in the counter at random into a sequence of seconds incremented by the minimum number of epoch seconds set in the configuration bit). This duration will be communicated only to the newly elected manager, that manager will store this stream of bits and will create a comparator loop that compares the current time to the target time (which is the number of seconds duration since the last election).

Once the comparison using AND gates yields 0 for all gates then the machine will proceed to generate the data for the next epoch and so the process will re-execute again.

At the end of the epoch (and every one after that), the manager will send a query to each machine and connect with as many as possible within a time limit (established in the configuration gates).

Prior to that a secret random array will be generated and compared to the communication key generated in the dialogue described above. The difference will be stored in memory and will be replaced by another generated key, keeping the one with the smallest overall difference between the keys and the random secret.

That difference, after the time period for acknowledgement will be used to select the manager for the next epoch. That manager will be notified and will turn on a specified bit in configuration to indicate they are the next manager and will also use the negotiated key to generate the number of seconds (or minutes or hours depending on values in the configuration segment) of when the next epoch will begin. This will be set in a key configuration bit that will compare the internal clock on a constant basis to the figure. Once the number is reached, the new manager will "wake up" and begin the tasks of management of the next epoch.

Other tasks for the current manager (in addition to admission of the new machines) will be to deprecate old machines. This deprecation will be achieved by designation of the epoch and secret key for the machine to be deprecated based on manager machine configuration (this will need to be submitted through human intervention by setting the deprecation epoch and secret key for the machine to be deprecated in non-volatile storage for the epoch to be done in).

A final task will be to generate the hash of the current epoch and conclude the epoch. In this case, the hash will be product of XOR gating the arrays of the manager secret key, epoch of admission, admitted keys, deprecated keys and epochs, current epoch and a number which is used only once in the chain (these "nonce" numbers will be stored in non-volatile storage as well by all members and will be passed to them through the replication of the blockchain into each of the nonvolatile storages via messages corresponding to the update of the new blocks for the epoch).

Figure 7:
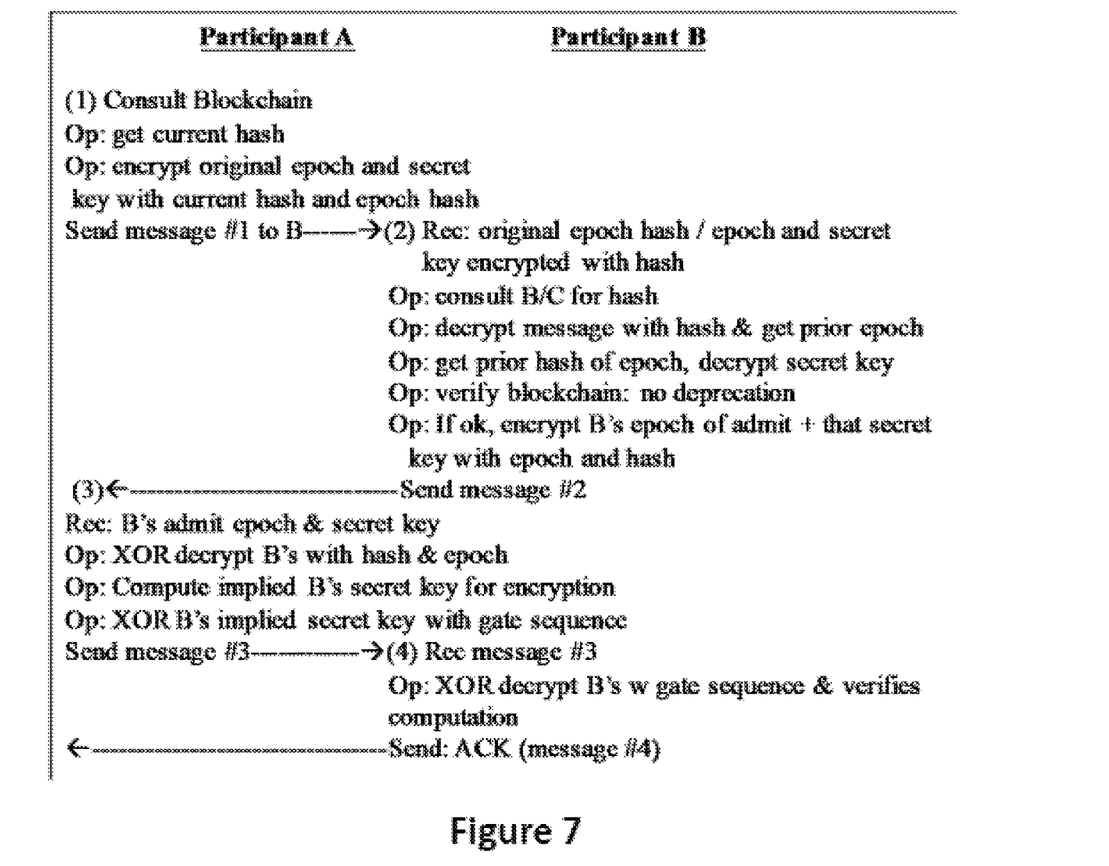
FIG. 7 schematically illustrates an exemplary dialog in accordance with at least one embodiment.

FIG. 7 is an exemplary dialog (i.e., a sequence of events) executed by two machines (participants A and B) in order to achieve key exchange.

In operation (1) the initiator, participant A retrieves from the machine memory the current hash block, its original epoch of admission ID & that epoch's hash and the machine's current secret ID. It then proceeds to XOR the epoch of admission ID with the current hash obtaining part 1 of the message. Next it proceeds to XOR the secret key for admission for that machine with their epoch of admission key and obtain part 2 of the message. The messages (i.e., message #1) then get sent to participant B in the form of a user name and password payload, which are required by the PPP subprotocol of TCP/IP.

In operation (2), participant B receives the two messages, consults the blockchain for the current hash and proceeds to XOR message #1 with the current hash to obtain the epoch of admission of the participant A. Participant B then consults the blockchain storage for that epoch ID and, when found, obtains the hash of that prior epoch. Next, participant B XOR that prior epoch hash with message #2 to obtain the secret key of the admission. This computed secret key is compared to the secret keys admitted in that epoch and if there is a match then the successive epochs from that admission will be traversed to determine if there is a deprecated secret key in a following epoch. If not, then the process will continue.

In operation (3), participant B will append its epoch of admission and its admission secret key forming one bit stream with both components and will also append the current epoch to the current hash. Next, those two bit streams will be XOR into the challenge message #3 that is sent to participant A.

Participant A will receive that challenge message #3 and will XOR the message with the epoch and the hash to derive the epoch of admission and the secret key of admission of participant B. Once that is known, participant A will consult the blockchain for that epoch and if found will also consult for that secret key. If both are found then participant A will proceed to retrieve any gate sequences in the blockchain from that point forward. Each one of those gate sequences will be XOR with the public key of the epoch to derive a new secret key for participant B until the current epoch is reached. At that point, the derived secret key for participant B will be operationalized with the current gate sequence and the original secret key for the challenge response to participant B. That message will be sent to participant B.

In operation (4), participant B will receive the message #3 and compare it with their original admission secret key and the current secret key for participate B, gated through the current gate sequence. If the two products match then participant B will send an "ACK" or acknowledge message back to participant A and the key exchange will be complete.
Variation—Using Only XOR and XNOR Gate Sequences A variation on the gate sequence above will be to only use the XOR or XNOR for the operations to be derived. This particular feature will allow the reversing of a particular sequence (whether the secret, public or private key) by knowledge of the gate sequence, the product being derived for the negotiated key and one of the sources. These gates have the particular property of being exclusive in their outcome and therefore can "reverse engineer" or derive the missing input if the output and one of the inputs is known (with the proper gate of course).
Variation—Using the Rule and Instruction Blocks The additional parameters of rule and instruction provide for further variation on the protocols that enable successful communication. An implied rule was described above that requires the initiating machine to provide their epoch and secret key of admission. This is rule 0, more rules can be derived where for instance instead of the epoch of admission, it could be 1 or 2 prior to admission with a derived secret key from the public key, gate sequence and the private key had the machine been admitted in that period. The receiving machine would walk that forward and re-compute the secret key based on the secrets revealed on the first approach and echo back with another challenge based on the parameters of the rule (this is an example; these rules can be specified in in the configuration section of the non-volatile storage).

Figure 10:
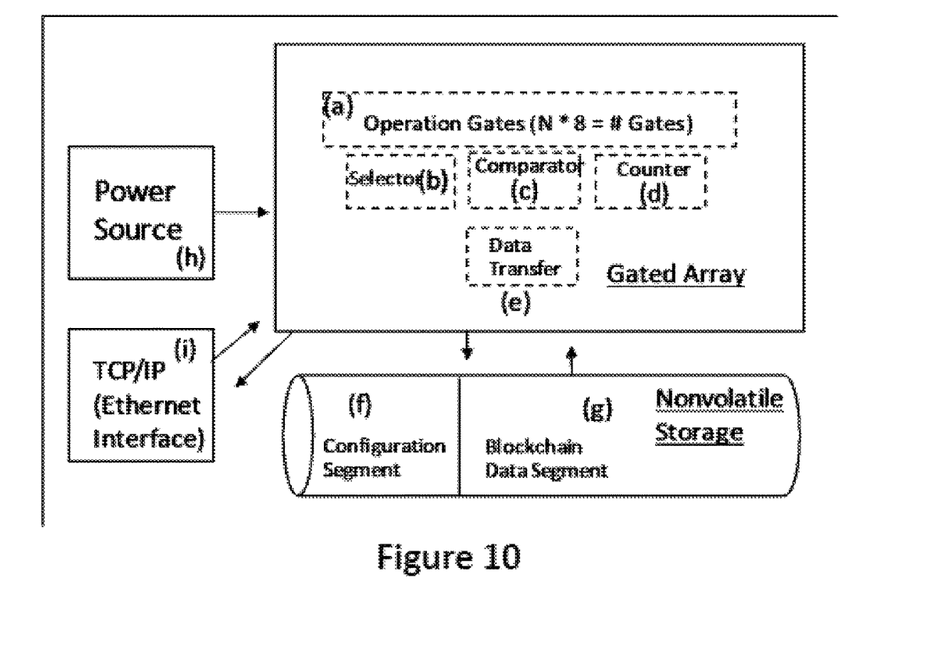
FIG. 10 is a schematic diagram of an exemplary system architecture in accordance with at least one embodiment.

The instruction parameter is intended on being used as a variation to sequences. The instruction could be coded to increase or further XOR the approach result. It is a set parameter that modifies the results.
Variation—Detection of Impostor Machines A third use of the rule parameters is for validation of private keys generated during admission. In this rule parameter, the initial approach from the starting machine is still the same. The machine receiving the approach would compute the plausible versions of the private key (due to the usage of OR and AND & their negations, the gates are not reversible and can produce multiple results). This product would be submitted to the epoch manager of that admission epoch with inquiry as to whether one of those private keys was valid. The manager for that epoch would consult nonvolatile storage (configured as a subledger in the block with only access by that machine's private key) and would acknowledge of such a key existed or not.
System Architecture:

Turning now to FIG. 10, a schematic diagram of a system architecture of the exemplary machine is depicted to illustrate further principles of the invention.

The machine architecture may include a gated array, which may comprise an operation segment, a selector segment, a comparator segment, a counter segment, and a data transfer segment, each of which comprises one or more logic gates configured to perform respective segment functions.

The operation segment may be configured to operate on one or more inputs, as described herein. The inputs may be random numbers or digit sequences, and may be received from an incoming message, or from the counter gates.

The counter segment may be configured to add 1 to an input.

The selector segment may be configured identify the parts of the configuration data to use. The selector segment may also be configured to determine wither the machine is in a communicating mode or a manager mode.

The comparator segment may be configured to receive two input values and generate the AND gate output of the received two input values.

The data transfer segment may be configured to control the input and output of computed block values and/or configuration data from the non-volatile storage.

The configuration segment may be configured in an indexed sequential file format that contains key operating data.

The machine architecture may further comprise a non-volatile storage. The non-volatile storage may include a blockchain data segment. The non-volatile storage may include the configuration segment. The blockchain data segment contains the blockchain blocks.

The machine architecture may include a power source. The power source may be configured to provide power to the gated array.

The machine architecture may include an Ethernet interface (or other communications interface). The Ethernet interface may be a standard pin or virtual pin interface into the machine.

Figure 9:
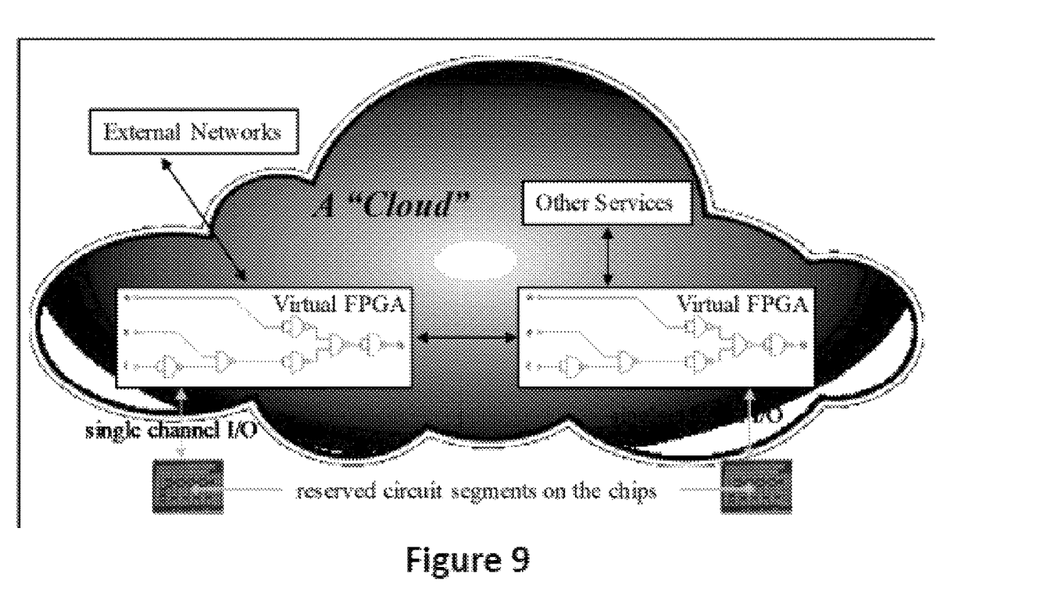
FIG. 9 schematically illustrates an exemplary internet-of-things (IOT) arrangement in accordance with at least one embodiment.

Turning now to FIG. 9, in at least one embodiment, the machine may be one of a plurality of such machines arranged as a community of virtual FPGA's (VFPGA's) with associated memories, in a public cloud. Such a system is referred to herein as an Internet-of-Things (IOT) arrangement.

The IOT arrangement represents a distributed system implementing one or more principles of the invention, using cloud-based VFPGA features. In at least one embodiment, the IOT arrangement may be a virtual simulation of a structure similar to that described with reference to FIG. 10, herein.

In the IOT arrangement, the functions of the machine are embodied in the VFPGAs. The computing device being protected is communicating through a reserved channel with the cloud hosting the VFPGAs.

A sample configuration of the VFPGAs may be as follows, for a 4,000 bit key and 1 key exchange per day processed:
- 30,000 gates divided into: a) 4000 gates each reserved for OR, NOR, AND, NAND, XOR and XNOR gates, b) 5000 gates reserved for manager tasks, and c) 1000 gates reserved for communication tasks.
- 3 MB non-volatile storage
- 65 KB volatile RAM
- 15 KB cache Accordingly, the distributed system according to the principles of the invention may be realized.

The embodiments described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCES

The following references are hereby incorporated by reference herein in their entirety:
W. Diffie, M. Hellman: "Multiuser Cryptographic Techniques" IEEE Transactions on Information Theory, November 1976.
https://projectf.io/posts/division-in-verilog/accessed on 17 Feb., 2021.
N. Ferguson, B. Schneier, T. Kohno: "Cryptography Engineering, Design Principles and Practical Applications" Wiley Publishing, Inc., Indianapolis, Indiana (2010).
P. Chu: "FPGA Prototyping by VHDL Examples" Wiley Publishing, Inc., Hoboken, New Jersey (2008).
S. Nakamoto; "Bitcoin: A Peer-to-Peer Electronic Cash System" www.bitcoin.org, last accessed Mar. 19, 2019.
J. Medellin, M. Thornton: "Performance Characteristics of Two Blockchain Consensus Algorithms in a VMWare Hypervisor" 2018 International Conference on Grid & Cloud Computing and Applications "GCA '18", p. 10-17.
J. Medellin, M. Thornton: "Simulating Resource Consumption in Three Blockchain Consensus Algorithms" "MSV '17" International Conference on Modeling, Simulation & Visualization Methods, p. 21-27.

C. Kozierok: "The TCP/IP Guide, a Comprehensive, Illustrated Internet Protocols Reference" No Starch Press, Inc., San Francisco, California (2017).

The invention claimed is:

1. A device, comprising:
a plurality of field programmable gated arrays (FPGAs), collectively configured to generate blocks of a blockchain during an epoch, based on gated operations that have derived, communicated, previously generated or random inputs;
a non-volatile storage configured to store the generated blocks, wherein the inputs are provided by one or more blocks generated during at least one prior epoch; and
a communications interface configured to communicate with a plurality of other devices so as to elect a manager from among the device and the plurality of other devices according to an election process, wherein the election process comprises:
generating a random number,
transmitting the random number to each of the plurality of other devices,
receiving respective random numbers from each of the plurality of other devices,
comparing the generated random number and the received random numbers to a current-epoch hash so as to identify the random number closest to the current-epoch hash, and
electing the device corresponding to the random number closest to the current-epoch hash as the manager.

2. The device of claim 1, wherein the FPGAs are part of a physical machine.

3. The device of claim 1, wherein the FPGAs are part of a virtual machine.

4. The device of claim 1, wherein the device is elected as a manager that is configured to generate, receive and send blockchain blocks to other devices via a communications protocol stack.

5. The device of claim 4, wherein the epoch is from an election of the device as the manager to an election of another device of the other devices as the manager.

6. The device of claim 1, further comprising a communications interface configured to communicate messages with at least one other device in accordance with a key exchange dialog in which the messages are generated based on gated operations of the FPGAs.

7. The device of claim 6, wherein the key exchange dialog comprises:
generating a first part of a message via applying gated operations of the FPGAs to an epoch-of-admission identifier and a current-epoch hash;
generating a second part of the message via applying gated operations of the FPGAs to a secret-key-for-admission of the device; and
transmitting the message to another device of the at least one other devices.

8. The device of claim 6, wherein the key exchange dialog comprises:
receiving a message from another device of the at least one other devices, wherein the other device has an epoch-of-admission identifier and a secret-key-for-admission, and wherein the message comprises a first part and a second part;
generating the epoch-of-admission identifier via applying gated operations of the FPGAs to the first part of the message and a current-epoch hash;
generating the first secret-key-for-admission via applying gated operations of the FPGAs to the second part of the message and a hash of a prior-epoch having the epoch-of-admission identifier;
matching the generated secret-key-for-admission to a local secret-key-for admission of the prior-epoch;
generating a reply message via applying gated operations of the FPGAs to a local epoch-of-admission identifier, the local secret-key-for-admission, and the current-epoch hash; and
transmitting the reply message to the other device.

9. The device of claim 6, wherein the key exchange dialog comprises:
receiving a message from another device of the at least one other devices, wherein the other device has an epoch-of-admission identifier and a secret-key-for-admission;
generating the epoch-of-admission identifier and the secret-key-for-admission via applying gated operations of the FPGAs to the message;
matching: (a) the generated epoch-of-admission identifier to a local epoch-of-admission identifier of a prior-epoch, and (b) the generated secret-key-for-admission to a local secret-key-for-admission;
generating a new-secret-key via, for each gate sequence from the prior-epoch to the current-epoch, applying gated operations of the FPGAs to the gate sequence and a public-key; and
transmitting a reply message with the new-secret-key to the other device.

10. The device of claim 6, wherein the key exchange dialog comprises:
receiving a message from another device of the at least one other devices, wherein the message includes a secret-key-for-admission;
matching the secret-key-for-admission with a local secret-key-for-admission; and
transmitting an acknowledgement message to the other device.

11. A device, comprising:
a plurality of field programmable gated arrays (FPGAs), collectively configured to generate blocks of a blockchain during an epoch, based on gated operations that have derived, communicated, previously generated or random inputs;
a non-volatile storage configured to store the generated blocks, wherein the inputs are provided by one or more blocks generated during at least one prior epoch; and
a communications interface configured to communicate messages with at least one other device in accordance with a key exchange dialog in which the messages are generated based on gated operations of the FPGAs, wherein the key exchange dialog comprises:
generating a first part of a message via applying gated operations of the FPGAs to an epoch-of-admission identifier and a current-epoch hash,
generating a second part of the message via applying gated operations of the FPGAs to a secret-key-for-admission of the device, and
transmitting the message to another device of the at least one other devices.

12. The device of claim 11, wherein the FPGAs are part of a physical machine.

13. The device of claim 11, wherein the FPGAs are part of a virtual machine.

14. The device of claim 11, wherein the device is elected as a manager that is configured to generate, receive and send blockchain blocks to other devices via a communications protocol stack.

15. The device of claim 14, wherein the epoch is from an election of the device as the manager to an election of another device of the at least one other devices as the manager.

16. The device of claim 11, further comprising a communications interface configured to communicate with a plurality of other devices so as to elect a manager from among the device and the plurality of other devices according to an election process.

17. The device of claim 16, wherein the election process comprises:
  generating a random number;
  transmitting the random number to each of the plurality of other devices;
  receiving respective random numbers from each of the plurality of other devices;
  comparing the generated random number and the received random numbers to a current-epoch hash so as to identify the random number closest to the current-epoch hash; and
  electing the device corresponding to the random number closest to the current-epoch hash as the manager.

18. The device of claim 11, wherein the key exchange dialog comprises:
  receiving a message from another device of the at least one other devices, wherein the other device has an epoch-of-admission identifier and a secret-key-for-admission, and wherein the message comprises a first part and a second part;
  generating the epoch-of-admission identifier via applying gated operations of the FPGAs to the first part of the message and a current-epoch hash;
  generating the first secret-key-for-admission via applying gated operations of the FPGAs to the second part of the message and a hash of a prior-epoch having the epoch-of-admission identifier;
  matching the generated secret-key-for-admission to a local secret-key-for admission of the prior-epoch;
  generating a reply message via applying gated operations of the FPGAs to a local epoch-of-admission identifier, the local secret-key-for-admission, and the current-epoch hash; and
  transmitting the reply message to the other device.

19. The device of claim 11, wherein the key exchange dialog comprises:
  receiving a message from another device of the at least one other devices, wherein the other device has an epoch-of-admission identifier and a secret-key-for-admission;
  generating the epoch-of-admission identifier and the secret-key-for-admission via applying gated operations of the FPGAs to the message;
  matching: (a) the generated epoch-of-admission identifier to a local epoch-of-admission identifier of a prior-epoch, and (b) the generated secret-key-for-admission to a local secret-key-for-admission;
  generating a new-secret-key via, for each gate sequence from the prior-epoch to the current-epoch, applying gated operations of the FPGAs to the gate sequence and a public-key; and
  transmitting a reply message with the new-secret-key to the other device.

20. The device of claim 11, wherein the key exchange dialog comprises:
  receiving a message from another device of the at least one other devices, wherein the message includes a secret-key-for-admission;
  matching the secret-key-for-admission with a local secret-key-for-admission; and
  transmitting an acknowledgement message to the other device.

* * * * *